DOUBLE INJECTION SEMICONDUCTOR DEVICE

Filed Oct. 5, 1961 3 Sheets-Sheet 1

INVENTOR
HWA N. YU

BY John F. Ohlandt Jr.

ATTORNEY

DOUBLE INJECTION SEMICONDUCTOR DEVICE

Filed Oct. 5, 1961 3 Sheets-Sheet 2

Nov. 24, 1964 HWA N. YU 3,158,754

DOUBLE INJECTION SEMICONDUCTOR DEVICE

Filed Oct. 5, 1961 3 Sheets-Sheet 3

United States Patent Office 3,158,754

Patented Nov. 24, 1964

3,158,754

DOUBLE INJECTION SEMICONDUCTOR DEVICE

Hwa N. Yu, Yorktown Heights, N.Y., assignor to International Business Machines Corporation, New York, N.Y., a corporation of New York Filed Oct. 5, 1961, Ser. No. 143,132

13 Claims. (Cl. 307—88.5)

This invention relates to signal translating devices utilizing semiconductor bodies and, in particular, to such devices wherein the body is composed of a substantially intrinsic material to which opposite conductivity contacts are made at either end and the semiconductor structure thus formed is so biased to provide what is known in the art as the injected plasmas conduction case.

In the injected plasmas conduction case, the situation within the intrinsic semiconductor body is such that both types of charge carriers, that is, holes and electrons, are being injected therein in equal numbers from opposite ends. For further details of the injected plasma conduction case, reference may be had to an article by D. A. Kleinman in the Bell System Technical Journal, May 1956, page 685, and to an article by Lampert and Rose entitled "Volume-Controlled, Two-Carrier Currents in Solids: The Injected Plasma Case" in the Physical Review, January 1, 1961, page 26.

What has been discovered is that by the provision of a control or gate electrode, suitably connected to the intrinsic semiconductor body which is biased to cause double injection of carriers, significant conductivity modulation of the body may be effected. Such an arrangement can be utilized to produce gain, to provide a high input impedance, to permit control of a negative resistance region in the output characteristic of the device and also to yield a constant current region in the output characteristic. An additional advantage of the device of the present invention is that high voltage applications are possible and the device is sensitive to magnetic fields and to light.

Essentially, the basic device of the present invention is constituted of a bar of intrinsic, that is, high resistivity, semi-conductor material, to which a number of injecting contacts are made. Conduction through the bar due to hole injection at one end and electron injection at the other is limited by space charges. The space charge regions exist because both holes and electrons recombine in the intrinsic body. The potential and space charge distribution in the body are changed by the action of a gate or control electrode thereby causing the conductivity of the bar and, advantageously, the current flow in an external circuit to be modulated.

The basic device of the present invention is denominated a chargistor and its characteristic curves are similar to those of vacuum tube devices indicating that the control or gate electrodes behave in a similar manner to the control grids of vacuum tubes. The unique operation of the chargistor relies on the electrostatic potential shielding as well as the conductivity modulation caused by space charge variations.

As indicated above, the forward conduction phenomena of a P-I-N diode has been the subject of many investigations. It has been shown that the space charge build up due to recombination of holes and electrons in the intrinsic body has limited the injected plasma density even though the space charge due to excess charge carriers over the plasma is a relatively small amount as compared with the plasma density.

The present invention is based upon the realization that if the space charge due to excess carriers over the plasma can be suitably compensated or enhanced, the conduction through the P-I-N structure can be significantly modified.

In accordance with one embodiment of the present invention, a hole injecting contact is placed in the region where excess electrons or negative space charge exists whereby, under precise bias conditions, the injected holes tend to neutralize the excess electrons and thereby cause the conductivity of the P-I-N structure to be increased. When the output voltage, that is, the voltage impressed across the opposite conductivity contacts at the ends of the intrinsic bar, is great enough, the potential in the intrinsic body becomes sufficiently high to reverse bias the junction formed by the gate electrode with the intrinsic boy, thereby cutting off injection from the gate electrode. In a transition region negative resistance is observed. After the transition region, with the gate electrode blocked from ejecting carriers, the chargistor action enters another region where the output current becomes constant regardless of any further increase in output voltage. Under the latter conditions, there is extraction of carriers; in this case, holes, whereby the space charge is enhanced due to the unbalance in the plasma density. This operation will become obvious from a consideration of the various characteristic curves which are included with this description.

Accordingly, it is a principal object of the present invention to provide a unique class of signal translating devices more versatile in their function than the known devices of the gaseous discharge or conventional semiconductor type.

A further object is to control the plasma flow within an intrinsic semiconductor body by virtue of the action of a control zone formed in the body.

Another object of this invention is to attain novel performance characteristics for semiconductor signal translating devices.

Another object of this invention is to provide novel performance characteristics which include negative resistance and constant current.

The foregoing and other objects, features and advantages of the invention will be apparent from the following more particular description of preferred embodiments of the invention, as illustrated in the accompanying drawings.

In the drawings:

FIG. 1 is a diagram of a semiconductor device including a substantially intrinsic body and extrinsic contacts at either end thereof, which structure employs the phenomenon of injected plasma conduction.

FIGS. 2*a* and 2*b* are energy level diagrams for the semiconductor body of the configuration illustrated in FIG. 1.

FIG. 3 is a diagram showing the carrier density within the intrinsic body of the semiconductor device of FIG. 1 under no-bias and forward-bias conditions.

FIG. 4*a* is an elevation view of a semiconductor device in accordance with one embodiment of the present invention.

FIG. 4*b* is a schematic showing of the network representative of the device of FIG. 4*a*.

FIG. 5*a* depicts a family of output V-I characteristic curves and a family of input current vs. output voltage curves of a triode chargistor in accordance with the present invention where the gate or control voltage is the parameter.

FIG. 5*b* depicts a family of output V-I characteristic curves of the triode chargistor for three basic conditions: where the input is open-circuited, where the input is short-circuited and where the output is saturated.

Figure 8A:
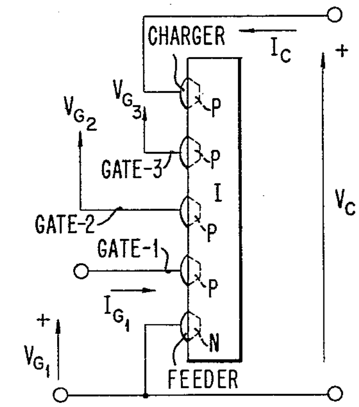

FIG. 8*a* illustrates another embodiment of a translating device of the present invention, which is a five-terminal or pentode chargistor.

Figure 8B:
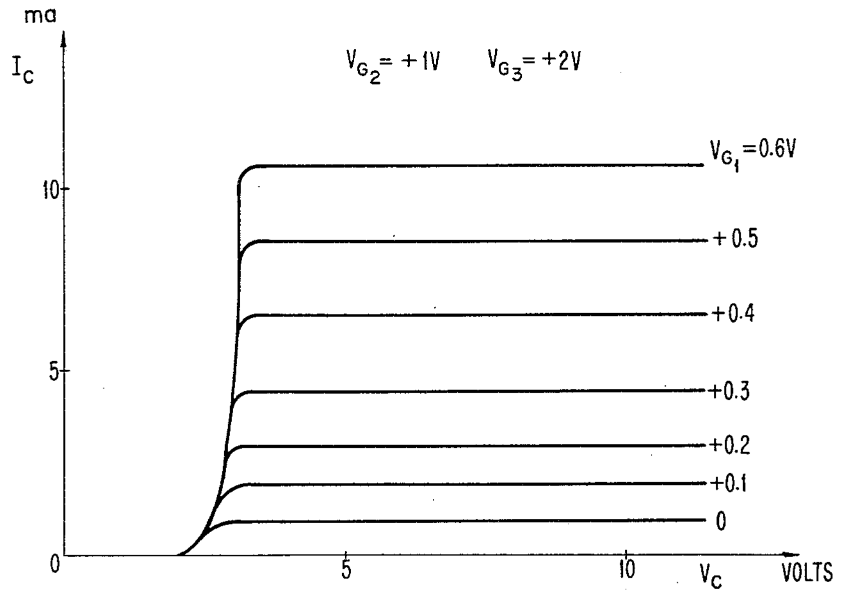

FIG. 8*b* depicts a family of output V-I characteristic curves for the device of FIG. 8*a*.

Before discussing from a detailed point of view the various embodiments of the present invention and their many attributes, features and operating modes, it may be advantageous to review some of the salient characteristics of semiconductor materials and the performance and phenomena involved in electron conduction thereby. Germanium is taken as an illustrative material although it will be understood that the same considerations apply to silicon as well as the semiconductor compounds, so that, in its broadest aspects, the present invention is not limited solely to the use of germanium.

Semiconductors of the type generally employed in signal translating devices are of the class known as extrinsic, that is, the basic materials contain small amounts of significant impurities which result in an excess in the materal of either of two types of electric carrier. If the dominant impuritiy or impurities are of the class known as donors, the free carriers are electrons and the material is denoted as n-conductivity-type. If the dominant impurity or impurities are of the class known as acceptors, the free carriers are holes and the material is denoted as p-conductivity-type. Conduction in extrinsic material or, flow of carriers, is due primarily to the impurities.

Most of the semiconductor devices of the prior art involve injection of carriers into a body or a zone thereof which is generally constituted of extrinsic material, such as germanium or the like. The injected carriers are of a sign opposite those normally present in excess in the body or zone thereof. Such injection is an operating feature of the well-known conventional transistor wherein minority carrier injection is controlled in accordance with signals to be translated. The injected minority carriers diffuse to a collecting contact where they affect the reverse saturation current of the collecting contact. Amplification of the signals is obtainable in a load circuit associated with the collecting contact of the device.

Other examples of semiconductor devices which also involve injection of carriers are the filamentary transistor as well as the double-base diode and other variants of the injection type. In the filamentary transistor ohmic contacts are made at opposite ends of a semiconductor body generally constituted of material of a predetermined conductivity-type. However, the body may also be composed of material of intrinsic conductivity. In the intrinsic type of filamentary transistor, the established sweeping field within the structure causes holes and electrons to flow at drift velocity in respectively opposite directions. A biasing battery fixes an emitter contact, which is made to the side of the body, at a potential slightly greater than that of the contiguous portion of the filamentary structure. The added carriers that are thus injected at the contact flow through the filament to the remote ohmic contact at the end of the filament. The presence of the injected carriers in the filament alters the conductivity of the filament and, therefore, also the resistance to flow of current from a source of potential impressed across the end contacts. Modulation of the filament in this manner results in current multiplication or gain for such a device.

Another semiconductor device that is well known in the art is the unipolar or field effect transistor. This device differs sharply from the aforementioned devices in that conduction is carried out in the body by only one type of carrier. The "working current" of this device flows between ohmic contacts, which constitute the source and the drain, in a semiconductor bar of predetermined conductivity-type or of intrinsic material. A biasing voltage is applied to a gate contact on the side of the bar and the establishment of a depletion region contiguous the gate contact controls the area of the channel through which the "working current" flows.

The distinction between the devices of the prior art enumerated above and devices in accordance with the present invention will be apparent from the following considerations. The semiconductor body of the device of the present invention is constituted of substantially intrinsic material. By "substantially intrinsic" is meant that the semiconductor material is of a high resistivity range; for germanium, on the order of 20 ohm-cm. and above. Furthermore, the conductivity of the bulk material of the body is higher than what it would be normally because of the injection of holes and electrons from opposite conductivity contacts which are made to the semiconductor body. This will be apparent as the description of the various embodiments of the present invention proceeds. Conduction through the substantially intrinsic body is then said to be carried out by "the injected plasma" similar to gaseous-discharge devices in which a plasma is formed where the number of positive charges is equal to the number of negative charges. The injected plasma would otherwise cause unlimited conductivity except for the limitation due to the space charge or excess charge carriers over the injected plasma. The excess charge carriers over the plasma is a necessary result of recombination of the injected carriers. Since the conductivity is truly bipolar or ambipolar in nature, two space charge regions in general are formed in the intrinsic body.

Two major principles of operation of devices constructed in accordance with the present invention are to be noted especially: the enhancement or the limiting of the injected plasma flow from what are known as charger and feeder contacts into the bulk material by virtue of either injection or extraction of either type of carrier. The electrosttaic potential shielding effect due to extraction of carriers by the control zone promotes the current-limiting principle, ideally by limiting or fixing the potential at one point of the bulk material by means of a constant potential applied at the control zone.

Figure 1:
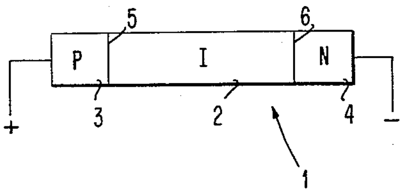

Referring now to FIG. 1, there is illustrated a P-I-N semiconductor structure, generally designated 1, including a substantially intrinsic body 2, and extrinsic regions 3 and 4 at either end which are of opposite conductivity-type. Junctions 5 and 6 exist where the extrinsic regions 3 and 4, respectively, contact the intrinsic body 2. A bias voltage, schematically indicated in FIG. 1, is impressed to cause forward bias across the P-I-N structure and, consequently, forward bias on both junctions 5 and 6. This forward bias causes double injection of carriers, that is, holes from the p-contact 3 and electrons from the n-contact 4.

Figure 2A:
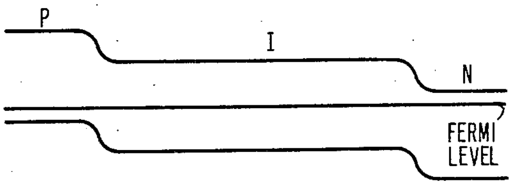
Figure 2B:
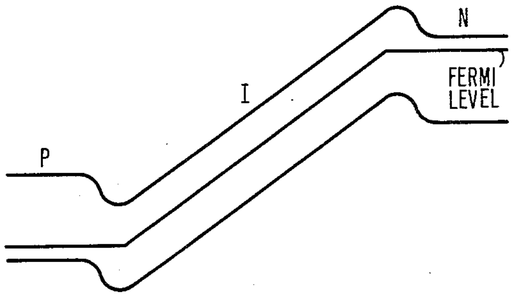

FIGS. 2*a* and 2*b* are energy level diagrams for the P-I-N structure of FIG. 1 under no-bias and forward-bias conditions, respectively. As is standard practice, the top line of these diagrams represents the edge of the conduction band and the lower line represents the edge of the filled or valence band. The fermi level, as indicated, lies close to the valence band in the p-type region, close to the conduction band in the n-type region and intermediate the conduction and valence bands in the intrinsic body.

Figure 3:
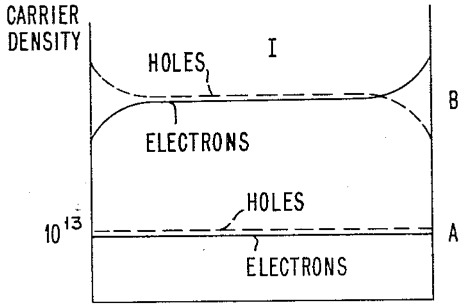

FIG. 3 is illustrative of the carrier density within the intrinsic body 2 of FIG. 1. At the lower portion of FIG. 3, marked A, the dotted and solid curves indicate the level of the carrier density within the intrinsic region 2 when no voltage is impressed across the P-I-N structure. At the upper portion of the figure, marked B, the carrier density for the condition of forward bias impressed across the P-I-N structure is depicted. In the region, at the left of the upper portion, there is indicated an excess of holes and in the region at the right, an excess of electrons.

Thus space charges exist in both of these regions due to the excess therein of one type of carrier for the condition of forward bias.

Figure 4B:
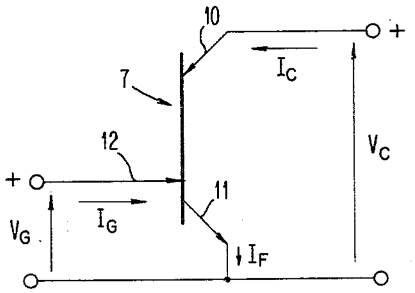
Figure 4A:
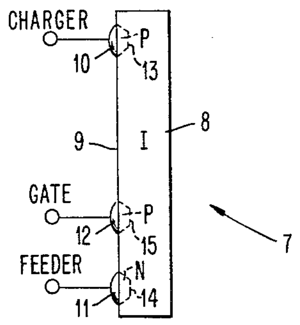

FIG. 4*a* illustrates in some detail the actual configuration of a triode chargistor in accordance with the present invention, wherein the device, generally denoted 7, is constituted of an intrinsic body 8, to whose surface 9 a p-contact 10 is made at the upper end; typically, by alloying a suitable impurity to the surface 9 thereby to create internally of the body 8 a recrystallized zone of p-conductivity-type. This contact 10 is termed a charger contact. Similarly, a contact 11 is made at the lower end of the body 8, which contact is of opposite conductivity-type to charger contact 10. This contact 11 is termed a feeder contact. A control or gate contact 12 is made to the surface 9 relatively close to the feeder contact 11. PI, NI and PI junctions, 13, 14 and 15, respectively, exist within the body due to these contacts 10, 11 and 12. As is indicated in FIG. 4*b*, from a network standpoint, the device may be arranged and considered as a four-terminal network with one terminal common to both input and output. The output or charger voltage is denoted by $V_C$, the output or charger current by $I_C$ and the input voltage and current by $V_G$ and $I_G$, respectively. The feeder current is denoted by $I_F$.

It will be understood that the specific configuration shown in FIG. 4*a* in accordance with the present invention is merely exemplary and that the device can be utilized with the feeder and charger contacts reversed; that is, the charger contact 10 can be n-conductivity-type and the feeder contact 11, p-conductivity-type. In this case the gate contact 12 would be n-conductivity-type. The same relative bias would be applied to the charger and feeder contacts.

Figure 5A:
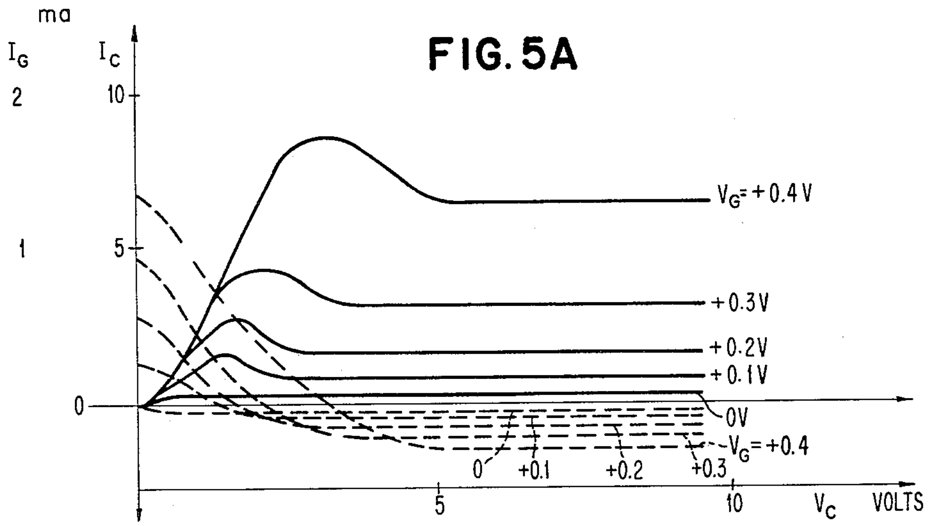

For the illustrative arrangement of FIG. 4*b*, with a positive voltage input to the p-type gate 12, the output $V_C$–$I_C$ characteristic curves are as shown in FIG. 5*a* in solid lines. The dotted lines in the same figure represent a corresponding family of input current ($I_G$) vs. output voltage ($V_C$) curves. It will be noted that the output characteristic curves exhibit varying negative resistance regions depending upon the particular gate voltage that is employed. Thus, for example, if a gate voltage of +0.1 volt is used at the input of the device of FIG. 4*b*, the output characteristic curve exhibits negative resistance at a comparatively low output voltage. The negative resistance region will occur at progressively higher output voltages as the input voltage ($V_G$) is increased. The device also exhibits the initiation of a constant current region at varying output voltages. The reasons for the existence of these different regions will be apparent from the discussion hereinafter.

The fact that the basic device of the present invention exhibits negative resistance and a constant current region makes the device useful for applications associated with switching, amplifying and oscillating circuits as will be apparent to those versed in the art.

Figure 5B:
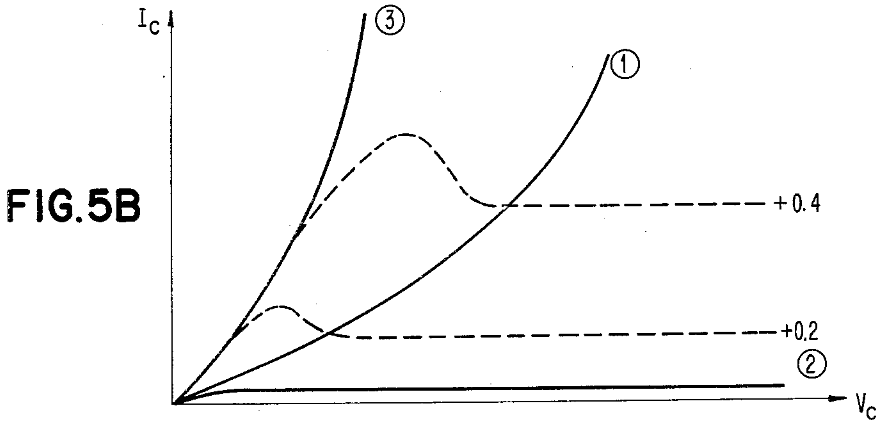

FIG. 5*b* shows the output $V_C$–$I_C$ characteristics for three basic conditions: when the input is open-circuited, when the input is short-circuited and when the output conductance is saturated. Curve 1 illustrates the condition where the input is open-circuited and corresponds to the simple case of the P-I-N diode having no gate contacts. The curves 2 and 3 indicate the outer bounds of the operating range of the device, that is, the active region for the device 7 lies between the "short-circuit" curve 2 and the "saturated" curve 3, which are analogous, respectively, to the cut-off curve and the saturated curve of a conventional transistor.

Figure 6:
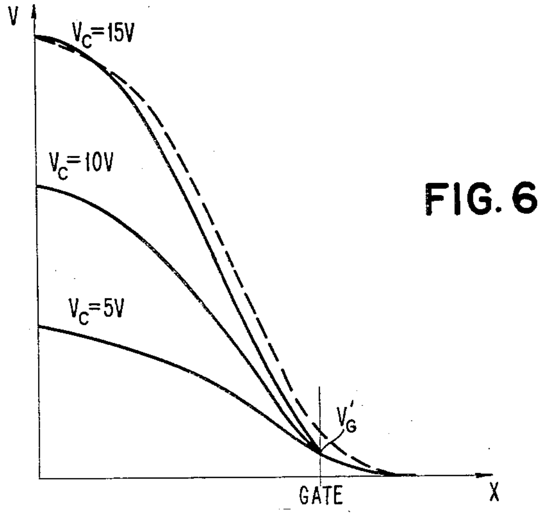
FIG. 6 depicts a plurality of curves for the potential distribution in the intrinsic region of a triode chargistor for different output voltages.

In FIG. 6, there is illustrated the potential distribution in the intrinsic body of the device 7 of FIGS. 4*a* and 4*b*. It will be noted that with varying output voltages ($V_C$) applied to the device, the potential distribution within the intrinsic body is such that the potential of the intrinsic body in the vicinity of the gate contact 12, which potential is labeled $V_G'$ in FIG. 6, assumes a value close to that which is applied at the gate ($V_G$). For the illustrated cases, $V_G' > V_G \cdot V_G'$ is constant, as is indicated in FIG. 6, for the varying output voltages that are applied between the charger and feeder contacts 10 and 11. The dotted line serves to indicate the potential distribution for the case of $V_C=15$ volts but with no gate contact to the body.

The control which is afforded by the gate contact 12 of the device of FIGS. 4*a* and 4*b* is achieved in accordance with several principles as will be apparent from the following considerations. Assume that the body 8 of FIG. 4*a* is of ideally intrinsic material so that the number of carriers, holes and electrons, therein is negligible. This corresponds to the situation which is portrayed at the lower portion of FIG. 3 as heretofore referred to. The intrinsic conductivity of the body 8, therefore, is very low. However, now assume that opposite conductivity-contacts 10 and 11 are made to the intrinsic body 8 and the body is forward biased. Now, the carrier density is as portrayed by the upper portion of FIG. 3. The charger contact 10 and the feeder contact 11 are injecting holes and electrons, respectively, into the bulk. The conductivity of the bulk intrinsic material is thus enhanced due to this double injection. This conductivity situation is depicted by the curve labeled 1 in FIG. 5*b*. The conductivity, however, is being limited by excess charge carriers due to recombination of holes and electrons. This situation may be appreciated by referring to the potential distribution curves of FIG. 6, which indicate a bending due to excess charge carriers over the plasma. Assume now that the gate contact 12 has been made to the intrinsic body 8 of FIG. 4*a* and that a short-circuit exists between the gate contact 12 and the feeder contact 11. This condition is represented in both FIGS. 5*a* and 5*b*; in 5*a* by the curve labeled $V_G=0$ volts and in 5*b* by the curve labeled 2. Thus, for the triode chargistor, 0 bias at the gate yields a minimum output current or cut-off condition. This contrasts with the conventional field effect transistor where 0 bias at the gate yields maximum output current. The situation which results for the triode chargistor with $V_G=0$ is explained by the fact that at all times the junction 15 formed between the gate contact 12 and the intrinsic body 8 is reverse biased.

Assume now that a potential of say +0.4 volt is impressed between the gate electrode 12 and the feeder contact 11. As the output voltage $V_C$ is increased from 0, there will initially be a condition where the potential applied to the gate contact 12 is greater than the potential in the portion of the intrinsic body 8 immediately contiguous the gate contact 12. Thus, the junction 15 is forward biased; hence, there will be injection of carriers, namely, holes into the intrinsic body. Thus, initially, the conductivity of the intrinsic body is much higher for a predetermined, applied output voltage $V_C$ for the case where $V_G$ is +0.4 volt than for the open-circuit case, represented by the curve 1. This is apparent from FIG. 5*b*. When, however, the voltage $V_C$ is increased until it reaches a value corresponding to the peak current value of $I_C$ ($V_G=+0.4$ volt), the potential within the intrinsic body immediately contiguous the gate contact 12 is such that the input current ($I_G$) goes to 0. With a further increase of $V_C$ there is a decrease in output current due to the beginning of extraction of carriers from the body as is indicated by the curve of FIGS. 5*a* and 5*b*. It will be noted that the curve labeled 1 in FIG. 5*b* intersects the typical $V_C$—$I_C$ characteristic curves at the point where these curves flatten out and exhibit the constant current condition. It is at this point that the electrostatic potential shielding effect takes place. What has happened internally of the body is that an extremely large space charge region has been built up and, hence, further increases in $V_C$ will have no effect in increasing $I_C$.

Figure 7:
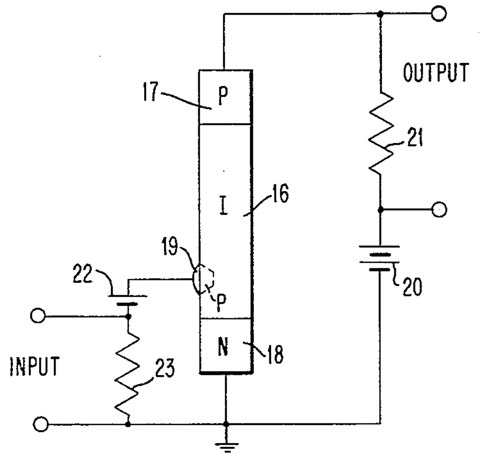
FIG. 7 is a circuit diagram wherein the translating device of FIG. 4*a* is incorporated.

From the preceding discussion it will be evident that in the arrangement illustrated in FIG. 7 wherein the triode chargistor device of FIG. 4*a* has been incorporated as an active element, variation of potential applied to the gate contact 19 of FIG. 7 controls the current delivered to a load 21 in accordance with signals impressed across an input impedance 23. In this arrangement a biasing battery 22 is provided in the input circuit and a battery 20 in the output circuit. The contacts labeled 17 and 18 correspond respectively to the charger and feeder contacts 10 and 11 of FIG. 4*a*. It will be appreciated that with the arrangement of FIG. 7 voltage gain can be realized. Transconductance for the device incorporated in the arrangement of FIG. 7 is given by the formula $$g_M = \frac{\partial I_C}{\partial V_G}\bigg| V_C \text{ constant}$$

Thus, referring to FIG. 5*a*, a typical value that can be obtained for $g_M$ would be on the order of 25,000 micromhos whereby the gain, which may be expressed for a constant current output device as Voltage Gain=$g_M \cdot R_L$, would have a value of 250 if the load resistor 21 in FIG. 7 is 10,000 ohms. It will also be apparent from the preceding discussion and by reference to FIG. 5*a* that in the case where the gate junction is reverse biased, that is, where $I_G$ is negative in value, (hence, flowing opposite to the direction shown in FIG. 4*b*) the current gain from the feeder to charger will be greater than 1.

The plasma density in the devices of the present invention is also controllable through other physical phenomena. By shining light of appropriate wave length on the surface of the intrinsic body or exposing the intrinsic body to radiating particles, hole-electron pairs may be created. The plasma density and, hence, the conductivity through the intrinsic material will be increased due to the added hole-electron pairs which become part of the plasma. If the device is immersed in a magnetic field, charge carriers will be deflected from their normal path through the body by virtue of the Hall effect or the Suhl effect. Since the surface recombination of holes and electrons can be made very much different from the recombination of carriers in the bulk, the effective recombination rate of carriers due to deflection of the carriers into a skewed path will be altered. Such a change in recombination rate of carriers will result in a different number of excess carriers as has been discussed heretofore in connection with FIG. 3. A change in the number of excess carriers causes the plasma density to be altered and, hence, the conductivity. Thus, the plasma flow in the body and, hence, the current delivered to a load, such as load 21 in FIG. 7, is controllable in accordance with the intensity of optical, radiative or magnetic signals impressed directly on the bulk of the intrinsic material.

A basic working model of the triode chargistor as exemplified by FIG. 4*a* was constructed of a slab of a high resistivity n-type germanium bar (resistivity approximately 45 ohm-cm., lifetime approximately 20$\mu$ sec.) and, thus, the material was substantially intrinsic. Dimensions were 0.01 x 0.30 x 0.20 inch. All three electrodes, that is, the p-type charger, the n-type feeder and the p-type gate, were alloyed on one surface of the bar as shown in FIG. 4*a*. Indium was used for the p-type contacts and lead-tin-arsenic was used for the n-type contact. The p-type gate electrode was placed closer to the n-type feeder than to the p-type charger in order to obtain high transconductance. All contacts were alloyed in the form of strips having dimensions of 0.10 inch x 0.30 inch.

The principles of the electrostatic potential shielding has been extended further by employing a plurality of gate contacts similar to those that were used with the triode chargistor of FIG. 4*a*. A tetrode chargistor has been realized by adding one additional contact to the basic structure of FIG. 4*a*. A pentode chargistor device is constructed as shown in FIG. 8*a*. In this device, the normal charger and feeder contacts are made to either end of the intrinsic body and 3 contacts, shown in FIG. 8*a* as p-type contacts, are made to the side of the body. In the case of the pentode chargistor shown in FIG. 8*a*, the various parameters can be controlled further by varying the constant voltage bias at either gate 2 or gate 3. A typical set of parameters has been depicted for the pentode chargistor in FIG. 8*b* where it is indicated that the voltage applied to gate 2 is maintained at +1 volt and the voltage at gate 3, at +2 volts. It is to be noted that the negative resistance regions, which are evident in the characteristic curves of FIG. 5*a* for the triode chargistor, do not appear for the particular case of the pentode chargistor of FIG. 8*a*. Further, the curves of FIG. 8*b* show a very sharp transition between the constant current regions and the saturation regions. It should be noted, however, that negative resistance regions for the various curves can be obtained by appropriate biasing. It will be appreciated by those skilled in the art that a varied number of electrodes can be employed and that current geometries can be used to make the chargistor versatile in its functional capabilities. As indicated heretofore, electrically complementary units with n-type gate electrodes on the same basic structure can be fabricated, in which case the n-type gate electrodes would be placed closer to the p-type feeder than to the n-type charger. Such units have been constructed and proved successful.

It is to be noted that, ordinarily, when intrinsic semiconductor material is used in a device, it is expected to be very sensitive to temperature variations. It has been found, however, that the power dissipation of several units, constructed in accordance with the present invention, was so high under test conditions that the temperature of these units reached the melting point of indium. When a heat sink was provided one unit was operated at 2 watts with a peak current of 0.5 ampere for several hours without any deterioration in characteristics. When good electrostatic potential shielding is obtained, the output impedance of the device has been observed to be as high as 20 meg-ohms and the operating voltage can be as high as 200 volts without any breakdown effect. The high voltage cabability of the chargistor device is primarily due to the aforementioned shielding effect which causes the potential drop to occur in the section of the intrinsic body between the charger and the gate. As a result the gate junction is not sustaining the entire voltage applied across the body whereas, in the case of the conventional transistor, the collector junction sustains the entire voltage applied to the collector electrode. Operation beyond 200 volts with the chargistor device is believed to be definitely possible. In practice, power gain on the order of 500 db has been obtained in a small signal amplifier circuit using one chargistor device.

While the invention has been particularly shown and described with reference to preferred embodiments thereof, it will be understood by those skilled in the art that various changes in form and details may be made therein without departing from the spirit and scope of the invention.

What is claimed is:

1. A signal translating device comprising a body of substantially intrinsic semiconductive material, a pair of opposite conductivity contacts, each disposed at respectively opposite ends of said body, biasing means connected to said opposite conductivity contacts for producing injection of holes and electrons respectively into said body and at least one predetermined conductivity electrode making contact along a surface of said body between said end electrodes and forming thereby a junction within said body.

2. A semiconductor device comprising a body of semiconductive material of substantially intrinsic conductivity, a first injecting contact at one end of said body of semiconductive material for injecting carriers of one type into said body, a second injecting contact at the other end of said body for injecting carriers of the opposite type into said body, a gate electrode of predetermined conductivity-type connected to said body, means for applying a source of potential connected to provide forward biasing between said first and second contacts, and means for applying a modulating source of potential between one of said contacts and said gate electrode whereby said modulating potential produces conductivity modulation of said substantially intrinsic body.

3. A semiconductor device comprising a semi-conductor body of substantially intrinsic material, output means for detecting a change in conductivity within said semiconductor body, said output means including a p-type contact and an n-type contact connected respectively to opposite ends of said semiconductor body, a source of potential connected to provide forward bias between said p-type contact and said n-type contact input means for producing modulation of the conductivity of said semiconductor body including a predetermined conductivity-type contact to said body.

4. A semiconductor device as defined in claim 3 wherein said predetermined conductivity-type contact is p-conductivity-type.

5. A semiconductor device comprising a body of semiconductive material of substantially intrinsic conductivity, a first injecting contact at one end of said body of semiconductive material for injecting carriers of one type into said body, a second injecting contact at the other end of said body for injecting carriers of the opposite type into said body, at least two gate electrodes of predetermined conductivity-type connected to said body, means for applying a source of potential connected to provide forward biasing between said first and second contacts and means for applying a source of potential to each of said gate electrodes thereby to produce conductivity modulation of said substantially intrinsic body.

6. A semiconductor device as defined in claim 5 wherein said gate electrodes are p-conductivity-type.

7. A semiconductor device comprising a body of semiconductive material of substantially intrinsic conductivity, a first injecting contact at one end of said body of semiconductive material for injecting carriers of one type into said body, a second injecting contact at the other end of said body for injecting carriers of the opposite type into said body, a source of potential connected to provide forward biasing between said first injecting contact and said second injecting contact, three gate electrodes of predetermined conductivity-type connected along the surface of said body between said first and second contacts, means for applying a source of potential between said first and second contacts and means for applying a source of potential to each of said three gate electrodes whereby said gate electrodes produce conductivity modulation of said substantially intrinsic body.

8. A triode chargistor device comprising a body of semiconductive material of substantially intrinsic conductivity, a first p-conductivity-type contact at one end of said body of semi-conductive material, a second n-conductivity-type contact at the other end of said body, a source of potential connected with its positive side to said first contact and its negative side to said second contact whereby said first contact injects holes into said body and said second contact injects electrons into said body, a gate electrode of p-conductivity-type connected to said body between said first and second contacts, means for applying a modulating source of potential between said gate electrode and said second contact whereby said modulating potential produces conductivity modulation of said substantially intrinsic body.

9. A pentode chargistor device comprising a body of semiconductive material of substantially intrinsic conductivity, a first p-conductivity-type contact at one end of said body of semiconductive material, a second n-conductivity-type contact at the other end of said body, a source of potential connected with its positive side to said first contact and its negative side to said second contact whereby said first contact injects holes into said body and said second contact injects electrons into said body, three gate electrodes of p conductivity-type connected to said body between said first and second contacts, and means for applying a source of potential to each of said gate electrodes whereby conductivity modulation of said substantially intrinsic body is obtained.

10. A semiconductor device comprising a body of substantially intrinsic semiconductor material, first and second end contacts of opposite conductivity-type materials, each integral at respectively opposite ends of said body, a gate contact of first conductivity-type material and positioned on said body in nearer adjacency to that one of said end contacts formed of an opposite conductivity-type material, and biasing means connected to said end contacts and to said gate contact for biasing those of said contacts formed of donor type semiconductor material more negatively than those of said contacts formed of acceptor type conductivity material, whereby said first and second end contacts inject opposite type carriers respectively into said body.

11. A semiconductor device comprising a body of semiconductor material of substantially intrinsic conductivity, a plurality of donor and acceptor contacts to said body, a first one of said contacts being located at one end of said body and being of predetermined conductivity type, a second one of said contacts being located at the other end of said body and being of opposite conductivity type, a source of potential connected to provide forward bias between said first and second end contacts, whereby said first and second end contacts inject opposite type carriers respectively into said body, a gate contact to said body located nearer to one of said end contacts and being of opposite conductivity type to said nearer one of said end contacts, means for applying a source of potential between said gate contact and the nearer one of said end contacts and connected so that the donor contact is at more negative potential than the acceptor contact.

12. A semiconductor device comprising a body of semiconductive material wherein the number of charge carriers of one type is substantially equal to the charge carriers of the other type, first and second contacts of opposite conductivity type materials, each at respectively opposite ends of said body, means for producing injection of both types of charge carriers into said body from respective ends thereof including a source of potential connected to provide forward biasing between said first and second end contacts, whereby at least one space charge region is created within said semiconductive body and means for altering the space charge distribution by altering the balance of the two types of injected carriers within said body, thereby to modify substantially the conductivity of said body.

13. The device as defined in claim 12 including means for sensing the change in conductivity of said semiconductive body.

References Cited in the file of this patent

UNITED STATES PATENTS

| | | |
|---|---|---|
| 2,790,037 | Shockley | Apr. 23, 1957 |
| 2,958,022 | Pell | Oct. 25, 1960 |